United States Patent
Koch

(10) Patent No.: US 7,254,221 B2
(45) Date of Patent: Aug. 7, 2007

(54) METHODS, SYSTEMS, AND PRODUCTS FOR PROVIDING COMMUNICATIONS SERVICES

(75) Inventor: Robert A. Koch, Norcross, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 10/802,085

(22) Filed: Mar. 16, 2004

(65) Prior Publication Data

US 2004/0174966 A1 Sep. 9, 2004

Related U.S. Application Data

(63) Continuation-in-part of application No. 09/753,234, filed on Dec. 29, 2000, now abandoned.

(51) Int. Cl.
*H04M 1/64* (2006.01)

(52) U.S. Cl. ............... 379/88.21; 379/88.17; 379/142.01; 370/353

(58) Field of Classification Search ............... 379/67.1, 379/88.11, 88.12, 88.19, 201.07, 207.12, 379/88.16, 142.01, 88.17, 88.21; 235/454; 370/353

See application file for complete search history.

(56) References Cited

U.S. PATENT DOCUMENTS

| | | | |
|---|---|---|---|
| 5,278,894 A | 1/1994 | Shaw | |
| 5,692,038 A | 11/1997 | Kraus | |
| 5,857,013 A | 1/1999 | Yue | |
| 5,963,626 A | 10/1999 | Nabkel | |
| 6,067,355 A | 5/2000 | Boon-Chen | |
| 6,182,045 B1 | 1/2001 | Kredo et al. | |
| 6,310,944 B1 * | 10/2001 | Brisebois et al. | 379/142.01 |
| 6,438,217 B1 | 8/2002 | Huna | |
| 6,608,888 B2 | 8/2003 | Bedingfield et al. | |
| 6,666,376 B1 * | 12/2003 | Ericson | 235/454 |
| 6,738,784 B1 | 5/2004 | Howes | |
| 6,757,898 B1 | 6/2004 | Ilsen et al. | |
| 6,768,789 B1 * | 7/2004 | Wilk | 379/67.1 |

* cited by examiner

*Primary Examiner*—Gerald Gauthier
(74) *Attorney, Agent, or Firm*—Scott P. Zimmerman, PLLC; Geoff Sutcliffe; Todd Mitchem

(57) ABSTRACT

Methods, systems, and products are disclosed for providing communications services. One method receives a communication from an originating party, with the communication intended for a receiving party. A database of pre-created data messages is accessed, with the database storing a pre-created data message having a common association between the receiving party and the originating party. The pre-created data message is then communicated.

17 Claims, 9 Drawing Sheets

METHODS, SYSTEMS, AND PRODUCTS FOR PROVIDING COMMUNICATIONS SERVICES

CROSS-REFERENCE TO RELATED APPLICATIONS

This application is a continuation-in-part of U.S. application Ser. No. 09/753,234, entitled "Web-Based Messaging System with Caller-Specific Messages," filed Dec. 29, 2000 now abandoned, and of which the "Summary of the Invention" section and the "Detailed Description of the Present Invention" section are incorporated herein by reference.

This application also relates to the commonly owned and concurrently filed U.S. application Ser. No. 10/801,222, entitled "Methods, Systems, and Products for Providing Communications Services", of which the "Brief Summary of the Invention" and the "Detailed Description of the Invention" sections are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers, telecommunications, telephonic communications, electrical communications and, more particularly, to messaging systems.

2. Description of the Related Art

The term "voice mail" is often utilized to refer to systems wherein parties may leave spoken messages for one another that are stored and retrieved at a later time. Voice mail is also utilized to refer to spoken messages attached to electronic mail communications.

Telephone answering systems are an example of a voice mail system. In a conventional telephone answering system a user records a greeting that is replayed to incoming callers if the user does not answer the telephone. Generally, the answering system allows an incoming caller to record a spoken message that may be retrieved and listened to at a later time.

Although widely utilized, telephone answering systems have not advanced to a significant degree. The United States patent literature discloses several approaches to improving telephone answering systems and their components. U.S. Pat. No. 5,278,894 to Shaw, the disclosure of which is hereby incorporated herein by reference, discloses a method and apparatus for providing customized greeting messages from a switch based voice messaging service. U.S. Pat. No. 6,067,355, to Lim et al., the disclosure of which is also hereby incorporated herein by reference, discloses a caller-ID device and/or integrated caller-ID and answering machine device which is configurable 1) to play pre-recorded announcement for the user when the caller ID information received over the PSTN (Public Switched Telephone Network) corresponds to stored information indicating an important caller; 2) to play a pre-recorded "block-the-blocker" outgoing message for the caller when a blocked-caller-ID code is received; and/or 3) to play a pre-recorded "reject call" outgoing message for the caller when the caller-ID information corresponds to stored information indicating an undesirable caller.

There are several methods and products that allow the user of a telephone to identify the source of an incoming telephone call. U.S. Pat. No. 5,692,038, to Kraus et al., the disclosure of which is hereby incorporated herein by reference, discloses a method for identifying the source of a communication, including the steps of: receiving the communication on a calling line; identifying the calling line number associated with the calling line; accessing a database to provide an identity for the source by finding a database entry corresponding to the calling line number; announcing this identity to the source; and requesting confirmation. U.S. Pat. No. 6,009,158, to Romero, the disclosure of which is also hereby incorporated herein by reference, discloses a caller ID call-back device that allows a user to automatically place telephone calls to selected directory numbers using several dialing plans.

It would be advantageous to have a telephone answering system that allows a user to provide a personalized caller specific greeting. For example, a home telephone user may wish to inform a contractor that the user will be home at a certain hour in order to let the contractor in. The home telephone user, however, would not want to leave a general answering machine message informing all callers that the user would be away from home and returning at a particular time. A personalized caller specific greeting system would allow the home telephone user's answering system to respond to a call from the contractor with a message such as "Thank you for your call, Ms. Jones will be home at 4:00 PM to let you into the house," while responding to other calls with a general message such as "We cannot answer the phone right now, please leave a message for us after the tone." Similarly, a business telephone user may wish to leave personalized caller specific greetings for specific clients etc. As will be understood by those of ordinary skill in the art, there are a large number of potential uses for such a personalized caller specific greeting system.

In addition to telephones, in recent years, the number of communication devices and their use, has increased dramatically. Examples of communication devices include telephones, analog and digital cellular phones, pages, wireless email devices, personal digital assistants and the like. Many such devices are able to directly access the world wide web and/or corporate intranet sites.

Prior telephone answering systems often required a user to physically interact with an answering machine in order to configure the machine. Alternatively, several types of answering machines were generally configurable via telephone. It would be advantageous, however, to have a telephone answering system that was configurable via an electronic communications pathway such as the world wide web. It would be further advantageous if such a telephone answering system provided for personalized caller specific greetings.

BRIEF SUMMARY OF THE INVENTION

The present invention provides a messaging system that overcomes the disadvantages with prior systems and provides new advantages to its users. This messaging system allows a user to provide personalized, pre-created messages in response to incoming callers and electronic communications. In embodiments of the present invention, the messaging system may be configured remotely, for example via the internet/world wide web.

According to the present invention, a messaging system comprises a pre-created data message and a processing system. The processing system comprises a caller identification system and a database of specific messages linked to specific caller identification data. The processing system is linked to a public switched telephone network, for example, through an intranet link including proper security measures, and to the world wide web.

A user of the system may access the processing system through the world wide web through a personal computer, personal digital assistant or wireless phone with internet capabilities. The processing system maintains an individual subscriber profile for the user that the user can configure with specific messages, e.g. voice mail greetings and data messages. The user may then control and specify which message is provided to a particular caller. The subscriber profile comprises information, including the subscriber's telephone number or numbers and caller identification data for the subscriber of the type generally found in public switched telephone networks. In embodiments of the present invention, a user may also access the processing system via a wire line or wireless telephone to configure their subscriber profile via Voice XML.

For use, a user accesses his or her individual subscriber profile via a personal computer or other means. The user then provides a list of one or more telephone numbers that, if a call is received from, the messaging system will provide a customized, pre-created message to the party placing the call to the subscriber. The telephone numbers are converted to their respective caller identification ("caller id") data. If a call is received by the subscriber, caller id data for call is obtained and the processing system is notified. The processing system and queries the subscriber profile to determine whether the caller id for the call matches a caller id specified by the subscriber. If so, the processing system provides the pre-created message entered by the subscriber into the processing system. The message is returned through the public switched telephone network to the caller. In embodiments of the present invention the processing system may direct a service control point (SCP) to direct a Service Switching Point (SSP) to route the incoming call to a specific network location, referred to herein as a voice/web gateway to receive the customized message.

This invention describes an entirely new messaging system. This invention allows a user (such as a subscriber of this messaging service) to compose pre-created data messages for particular individuals and/or groups. That is, the subscriber can compose individualized data messages for friends, family members, co-workers, and groups of people. When the subscriber receives a telephone call, or an electronic communication, from an originating party (e.g., the friend or family member), this invention automatically replies with the particular pre-created data message intended for that originating party. The pre-created data message is communicated to the originating party, and the originating party may then read the automatically-replied data message.

This invention provides pre-created data messages. One of the embodiments receives a communication from an originating party, with the communication intended for a receiving party. The term "communication," as used herein, can mean both a telephone call and/or a data message. The term "communication," then, can be a familiar Plain Old Telephone System call and can be an Internet Protocol call over a Voice-Over Internet Protocol communications network. The term "communication" may also include electronic communications, such as data messages using an Internet Protocol (e.g., email). When the communication is received, a database of pre-created data messages is accessed. The database stores a pre-created data message having a common association between the receiving party and the originating party. The pre-created data message is then communicated. The term "pre-created data message" means any previously composed electronic communication message using an Internet Protocol. The pre-created data message may include data message, such as emails, instant messages, short messages, and packetized Voice-Over Internet Protocol communications.

Another of the embodiments describes another method for providing communications services. Here a communication is received from an originating party, with the communication intended for a receiving party. A database of pre-created data messages is accessed. The database stores multiple pre-created data messages associated with the receiving party. One of the pre-created data messages is selected and communicated via an Internet Protocol communications network.

Other embodiments of this invention describe a system for providing communications services. A Communications Module is stored in a memory device, and a processor communicates with the memory device. The Communications Module receives a communication from an originating party that is intended for a receiving party. The Communications Module accesses a database of pre-created data messages. The database stores a pre-created data message having a common association between the receiving party and the originating party. The Communications Module then initiates a communication of the pre-created data message.

Still other embodiments of this invention describe a computer program product. A computer-readable medium stores a Communications Module. The Communications Module receives a communication from an originating party that is intended for a receiving party. The Communications Module accesses a database of pre-created data messages. The database stores a pre-created data message having a common association between the receiving party and the originating party. The Communications Module then initiates a communication of the pre-created data message.

An advantage of the present invention is that the subscriber profile information may be remotely accessed and configured. That is, a subscriber may utilize the world wide web, via a personal computer, personal digital assistant or wireless phone, to compose the pre-created messages. Thus, a subscriber may configure his or her information and profile from locations remote from the phone receiving the incoming calls. Another advantage of the present invention is that a subscriber may configure their profile utilizing Voice XML input. This aspect of the present invention allows the subscriber to update their profile remotely utilizing a voice link. A further advantage of the present invention is that a subscriber may configure their profile to deliver specific pre-created messages, including customized data messages, to specific incoming callers and to incoming electronic communications.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein.

DETAILED DESCRIPTION OF THE INVENTION

Figure 1:
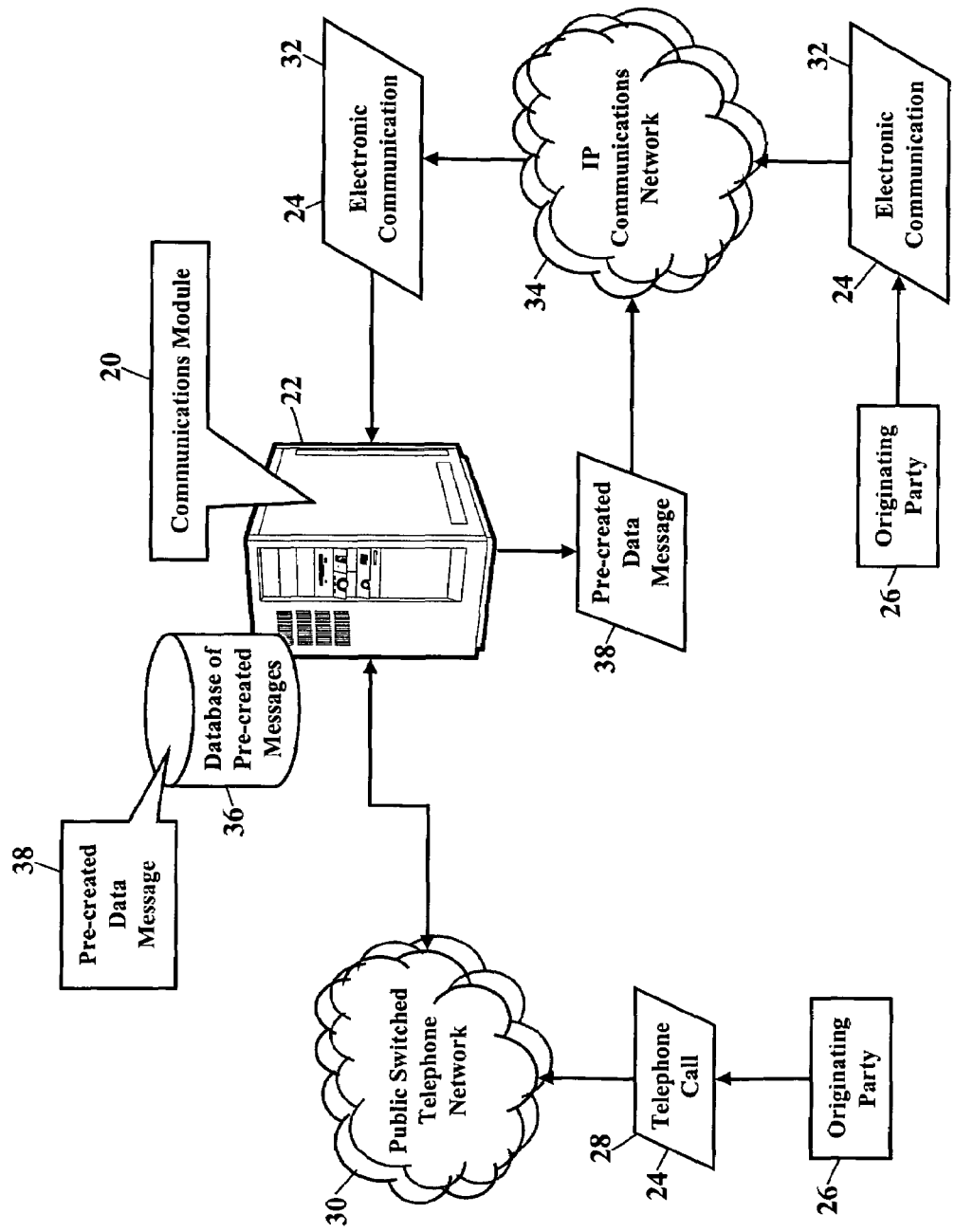
FIG. 1 is a simplified schematic illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention describes an entirely new messaging system. This invention allows a user (such as a subscriber of this messaging service) to compose pre-created data messages for particular individuals and/or groups. That is, the subscriber can compose individualized data messages for friends, family members, co-workers, and groups of people. When the subscriber receives a telephone call, or an electronic communication, from an originating party (e.g., the friend or family member), this invention automatically replies with the particular pre-created data message intended for that originating party. The pre-created data message is communicated to the originating party, and the originating party may then read the automatically-replied data message.

The messaging system of this invention is easy to establish and to use. The subscriber accesses a user interface. The user interface allows the subscriber to compose each pre-created data message. The user interface then asks the subscriber to associate each pre-created data message to any number of intended recipients. Each recipient can be identified by any identifying information. Each recipient, however, is most likely identified by their calling telephone number, their email address, their listing information, or any other Internet Protocol information (e.g., their email address). The user interface also asks the subscriber to select what event triggers the automatically-replied data message. The subscriber, for example, might want a calling party to automatically receive a pre-created data message. If the subscriber receives an email from a friend, the subscriber might want that friend to receive a pre-created, automatically-replied email. The subscriber may also choose a pre-created data message when an Internet Protocol telephone call is received. The subscriber may even choose to have others notified when a telephone call is received. Each pre-created data message, in fact, may be communicated to any destination of the subscriber's choosing, such as individuals and/or groups (e.g., a "buddy list").

This invention allows the subscriber to create personalized, pre-created messages for particular people. This invention differs from traditional "auto-reply" email software features in that the subscriber can compose unique, personalized messages for any number of recipients. The subscriber, for example, might compose one or more pre-created messages for family members and, yet, different pre-created messages for coworkers. If a coworker should attempt to reach the subscriber (via a telephone call or an electronic communication) on a vacation day, the pre-created data message might read "I will be on vacation and will return Monday." Should a family member, however, attempt to reach the subscriber, the pre-created data message might read "We have gone skiing in the mountains, but we will return in time for Dave's birthday party." The subscriber may even choose to compose pre-created data messages for particular individuals. "Steve, we plan to arrive at your house Saturday evening around 7 PM." "Jane, the kids are sick, so we must cancel our lunch." "Mr. Jones, I will return to the office Monday, however, the monthly report is attached to this message." "Team, because it is raining, I have rescheduled baseball practice for Monday evening." The subscriber simply composes whatever message is desired, and the subscriber then associates that message to the individual recipient(s).

FIG. 1 is a simplified schematic illustrating the embodiments of this invention. The embodiments of this invention include a Communications Module 20. The Communications Module 20 comprises methods, systems, computer programs, and/or computer program products that provide pre-created data messages in response to incoming communications. The Communications Module 20 operates within any computer system, such as a communications server 22. The Communications Module 20 receives, or detects receipt of, a communication 24 from an originating party 26. As FIG. 1 illustrates, the term "communication" can mean a familiar Plain Old Telephone System (POTS) telephone call 28. The Communications Module 20, as will be later explained, would then operate within the communications server 22 interfacing with a Public Switched Telephone Network (PSTN) 30. The term "communication" may also include an electronic communication 32, such as an email message, an instant message, a short messaging service, voice-over internet protocol (VoIP) calls, and/or other data messages, communicated via an Internet Protocol communications network 34. When the communication 24 is received, a database 36 of pre-created data messages is accessed. The database 36 stores a pre-created data message 38 having a common association between a receiving party and the originating party. The pre-created data message 38 is then retrieved and communicated via the Internet Protocol communications network 34.

Figure 2:
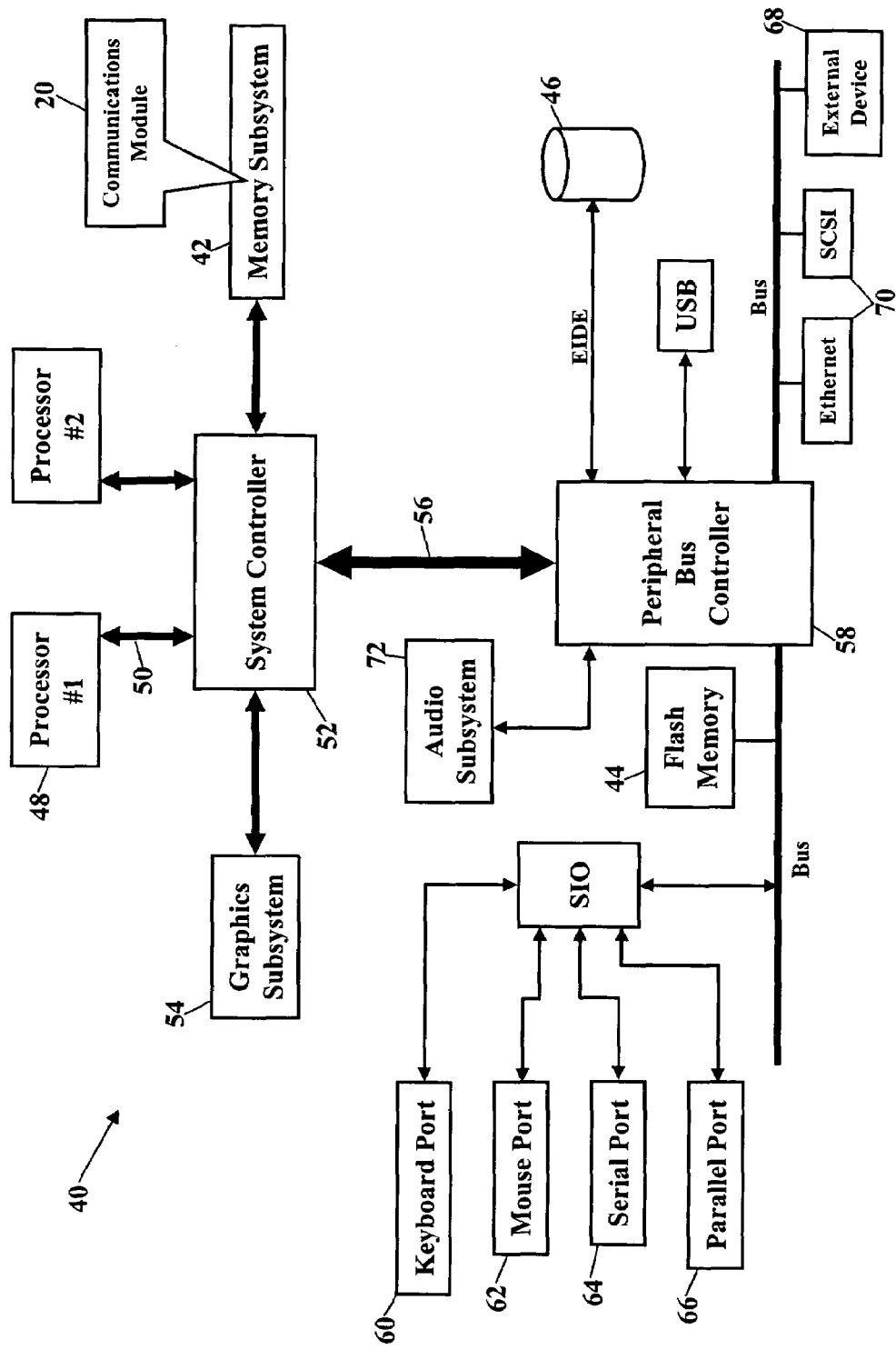
FIG. 2 depicts a possible operating environment for the embodiments of this invention

FIG. 2 depicts another possible operating environment for the embodiments of this invention. FIG. 2 is a block diagram showing the Communications Module 20 residing in a computer system 40. The computer system 40 may be any computing system (such as the communications server 22 shown in FIG. 1) or any other computer device. As FIG. 2 shows, the Communications Module 20 operates within a system memory device. The Communications Module 20, for example, is shown residing in a memory subsystem 42. The Communications Module 20, however, could also reside in flash memory 44 or a peripheral storage device 46. The computer system 40 also has one or more central processors 48 executing an operating system. The operating system, as is well known, has a set of instructions that control the internal functions of the computer system 40. A system bus 50 communicates signals, such as data signals, control signals, and address signals, between the central processor 48 and a system controller 52 (typically called a "Northbridge"). The system controller 52 provides a bridging function between the one or more central processors 48, a graphics subsystem 54, the memory subsystem 42, and a PCI (Peripheral Controller Interface) bus 56. The PCI bus 56 is controlled by a Peripheral Bus Controller 58. The Peripheral Bus Controller 58 (typically called a "Southbridge") is an integrated circuit that serves as an input/output hub for various peripheral ports. These peripheral ports are shown including a keyboard port 60, a mouse port 62, a serial port 64 and/or a parallel port 66 for a video display unit, one or more external device ports 68, and networking ports 70 (such as SCSI or Ethernet). The Peripheral Bus Controller 58 also includes an audio subsystem 72. Those of ordinary skill in the art understand that the program, processes, methods, and systems described in this patent are not limited to any particular computer system or computer hardware.

Those of ordinary skill in the art also understand the central processor 48 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 42, flash memory 44, or peripheral storage device 46) may also contain an application program. The application program cooperates with the operating system and with a video display unit (via the serial port 64 and/or the parallel port 66) to provide a Graphical User Interface (GUI). The Graphical User Interface typically includes a combination of signals communicated along the keyboard port 60 and the mouse port 62. The Graphical User Interface provides a convenient visual and/or audible interface with a user of the computer system 40.

Figure 3:
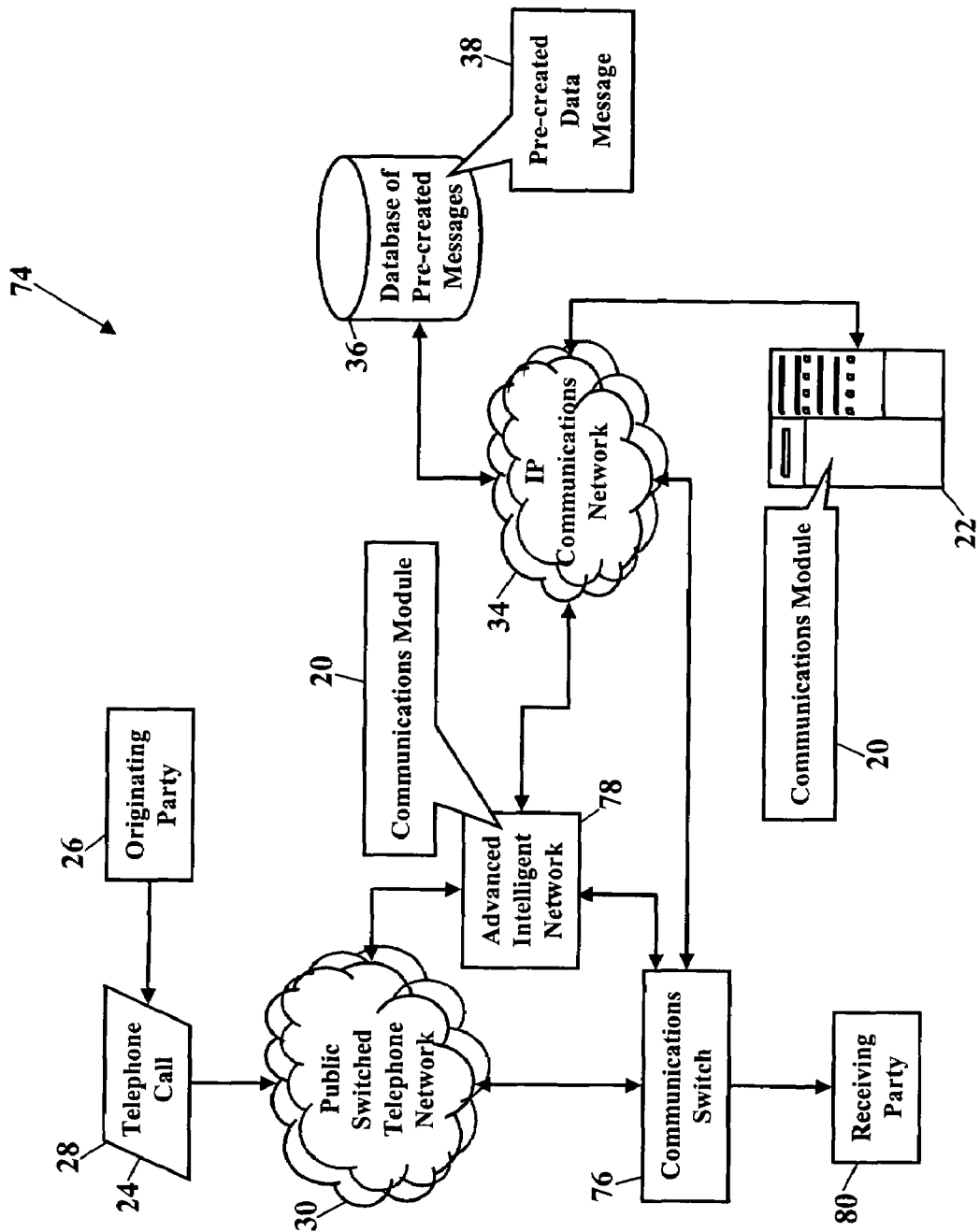
FIGS. 3-5 illustrate yet other possible operating environments for the embodiments of this invention.
Figure 4:
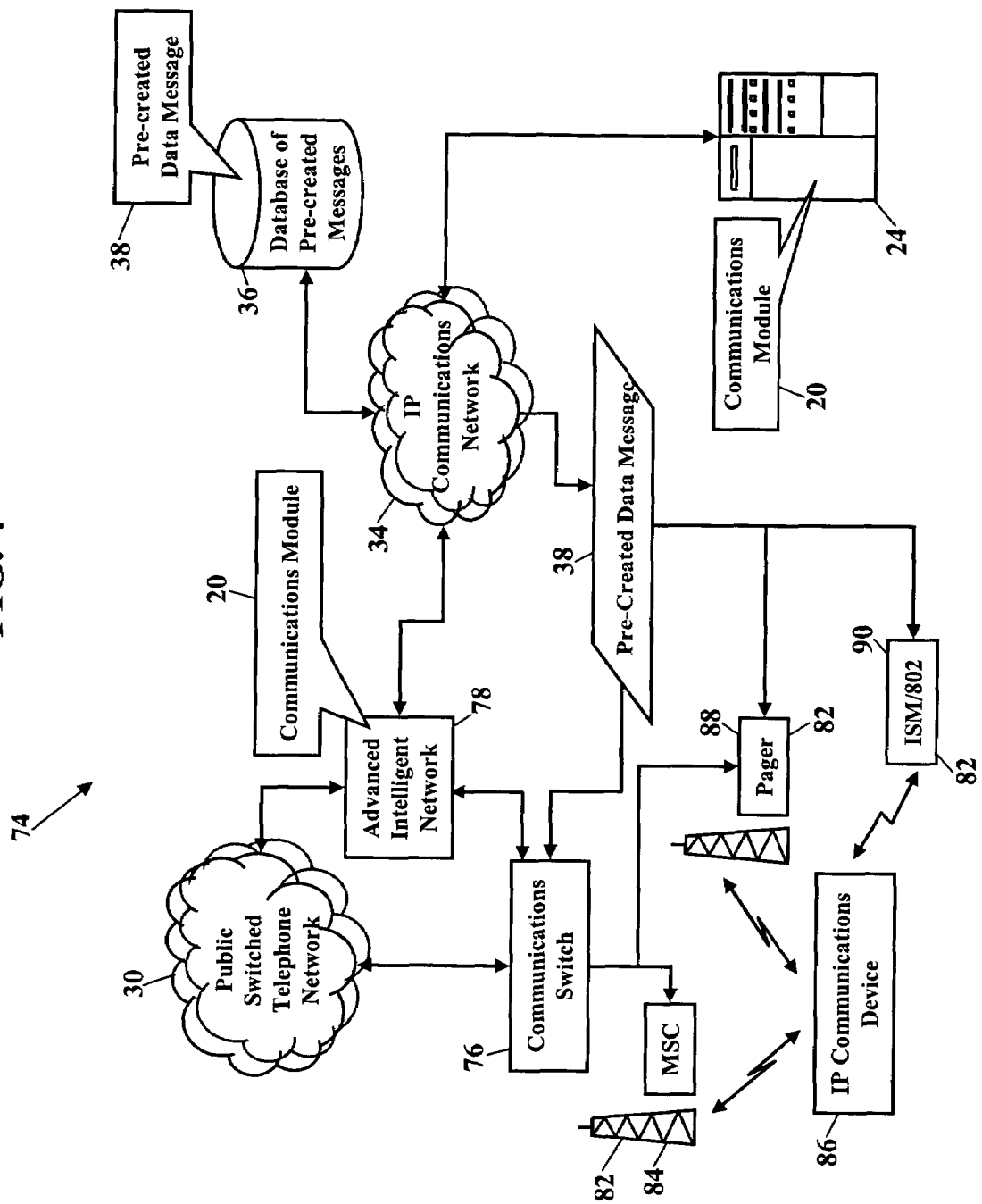

FIGS. 3 and 4 illustrate yet other possible operating environments for the embodiments of this invention. FIG. 3 is a schematic showing the Communications Module 20 operating within an intelligently-controlled communications network 74. This communications network 74 further represents an operating environment for the Communications Module 20. The communications network 74 includes a communications switch 76 of the Public Switched Telephone Network 30. The communications switch 76 includes Advanced Intelligent Network (AIN) componentry 78 controlling many features of the communications switch 76. The Advanced Intelligent Network (AIN) componentry 78 includes the Communications Module 20 operating within the computer system (shown as reference numeral 40 in FIG. 2). The communications switch 76 and the Advanced Intelligent Network (AIN) componentry 78 interface with the Internet Protocol communications network 34. The Internet Protocol communications network 34 may also communicate with the communications server 22, and the Communications Module 20 resides within the communications server 22. The signaling between the communications switch 76, the Public Switched Telephone Network 30, the Advanced Intelligent Network 78, and the Internet Protocol communications network 34, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

As FIG. 3 illustrates, the Communications Module 20 receives, or detects the receipt of, the communication 24. Here the communication 24 is the Plain Old Telephone System (POTS) telephone call 28. The telephone call 28 originates from the originating party 26, and the telephone call 28 is intended to terminate at a receiving party 80. The telephone call 28 is communicated via the Public Switched Telephone Network 30 and received at the communications switch 76. The Advanced Intelligent Network componentry 78 suspends processing of the telephone call 28 and consults the Communications Module 20. The Communications Module 20 determines whether the receiving party 80 subscribes to the messaging service of this invention. If the receiving party is a subscriber to this messaging service, the Communications Module 20 then accesses the database 36 of pre-created data messages. The database 36 of pre-created data messages is shown remotely located and communicating with the Internet Protocol communications network 34. The database 36 of pre-created data messages, however, could alternatively or additionally be locally located with the Advanced Intelligent Network componentry 78 and/or the communications server 22. The database 36 of pre-created data messages maps the receiving party, the originating party, and at least one pre-created data message. The Communications Module 20 queries the database 36 for the pre-created data message 38 having a common association between a receiving party and the originating party. If a match is found, the pre-created data message 38 is then retrieved and communicated via the Internet Protocol communications network 34.

FIG. 4 further illustrates communication of the pre-created data message 38. Once the pre-created data message 38 is retrieved, the pre-created data message 38 may then be communicated to various destinations. As FIG. 4 shows, the pre-created data message 38 may be wirelessly communicated via a wireless communications network 82. The pre-created data message 38 may communicate to a Mobile Switching Center 84 (shown as "MSC") via the communications switch 76. The pre-created data message 38 would then be broadcast to an Internet Protocol communications device 86. The pre-created data message 38 may also communicate to a pager communications network 88 via the Internet Protocol communications network 34 and/or the communications switch 76. The pre-created data message 38 may also be wirelessly communicated using any other frequency within the electromagnetic spectrum, such as the Industrial, Scientific, and Medical (shown as "ISM") band and/or any wireless communication standard, such as the I.E.E.E. 802 family of standards (both shown as reference numeral 90). The wireless communications network 82 may also include satellite communications systems and microwave communications systems.

Figure 5:
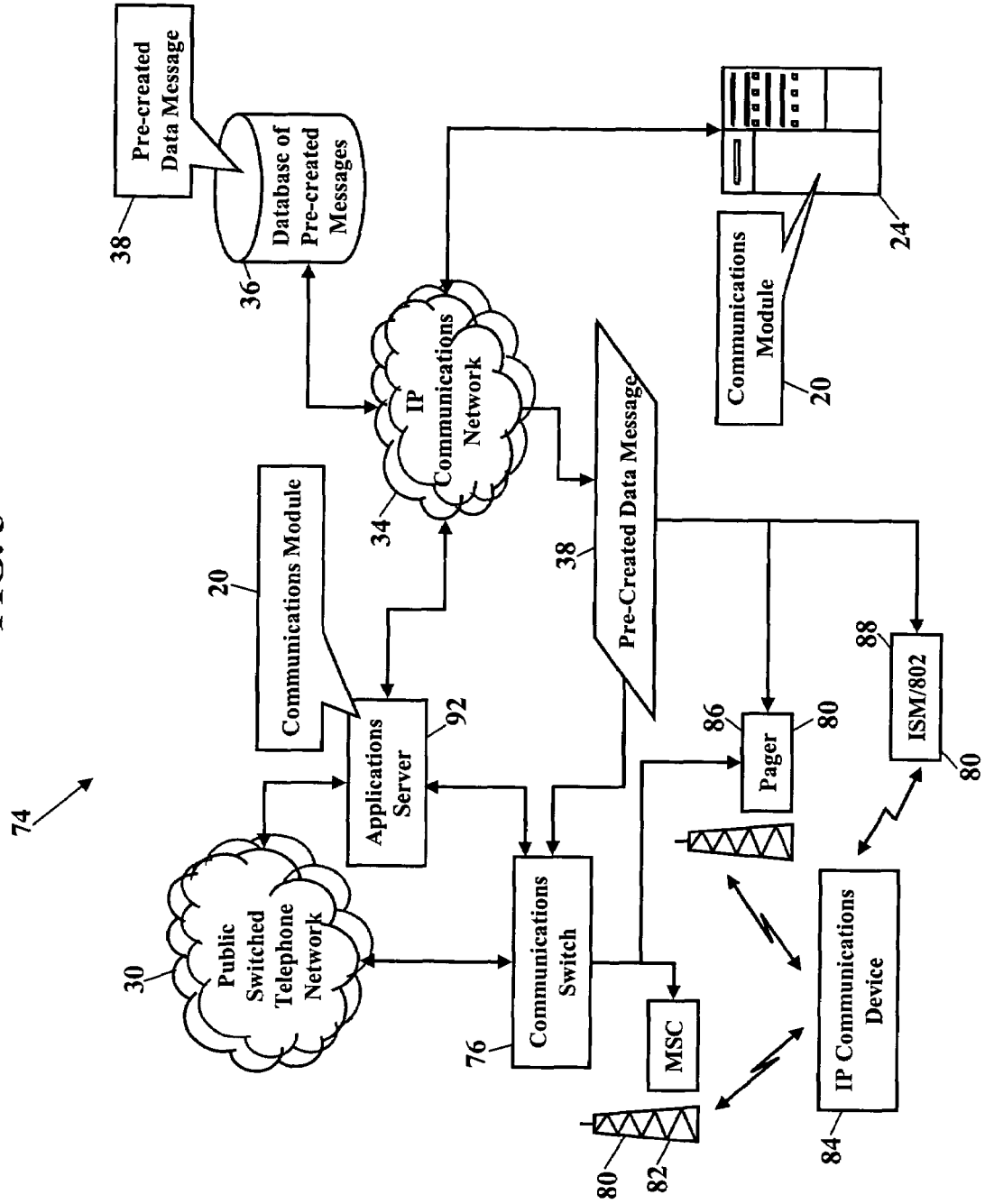

FIG. 5 is similar to FIG. 4, yet FIG. 5 illustrates a packet-network architecture. This packet network represents an alternative operating environment for the Communications Module 20. Here the communications switch 76 is a packet-based "softswitch." This softswitch 76 uses software control to provide voice, data, and video services by dynamically changing its connection data rates and protocols types. An application server 92 interfaces with the softswitch 76 via a packet protocol, such as the Session Initiation Protocol (SIP). This application server 92 includes voice service protocols, triggers, and/or operations that allow the Public Switched Telephone Network 30 and the Internet Protocol communications network 34 to interoperate.

The embodiments of this invention are particularly useful for messaging systems. As FIGS. 3-5 illustrate, once the pre-created data message 38 is retrieved, the pre-created data message 38 may then be communicated to various destinations. The pre-created data message 38, for example, could be forwarded to any number of IP Addresses that a subscriber might specify. The subscriber could compose pre-created data messages for individuals and/or for groups. The subscriber could may associate a particular data message to an individual and/or a group (e.g., a "buddy list" or a group distribution list). The pre-created data message 38 might be forwarded to the originating party (shown as reference numeral 26 in FIG. 1) as an automatic response to the incoming telephone call or electronic communication (shown, respectively, as reference numerals 24 and 32 in FIG. 1). The pre-created data message 38 could also be forwarded to any other destination(s) the subscriber might specify.

The subscriber might specify personalized, pre-created messages for particular people. This invention allows the subscriber to compose the pre-created data message 38 and then associate that message 38 to individuals. The subscriber, for example, might compose one or more pre-created messages for family members and different pre-created messages for coworkers. If a coworker should attempt to reach the subscriber (via the telephone call 28 or the electronic communication 32 in FIG. 1) on a vacation day, the pre-created data message 38 might read "I will be on vacation and will return Monday." Should a family member, however, attempt to reach the subscriber, the pre-created data message 38 might read "We have gone to the beach, and we will join John's family for Sunday dinner." The subscriber may even choose to compose pre-created data messages for particular individuals. "John, we plan to arrive at your house Sunday evening around 6 PM." "Mary, could you bring potato salad to John's?" "Mr. Jones, I will return to the office Monday, however, the monthly report is attached to this message." "Team, because it is raining, I have rescheduled baseball practice for Monday evening." The subscriber simply composes whatever message is desired, and the subscriber then associates that message to the individual(s). The subscriber would most likely associate the message to the email address of the recipient party (e.g., the originating party 26 of the communication 24). The subscriber, however, could associate the message to whatever Internet Protocol address/identifier corresponds to the recipient party/parties.

Figure 6:
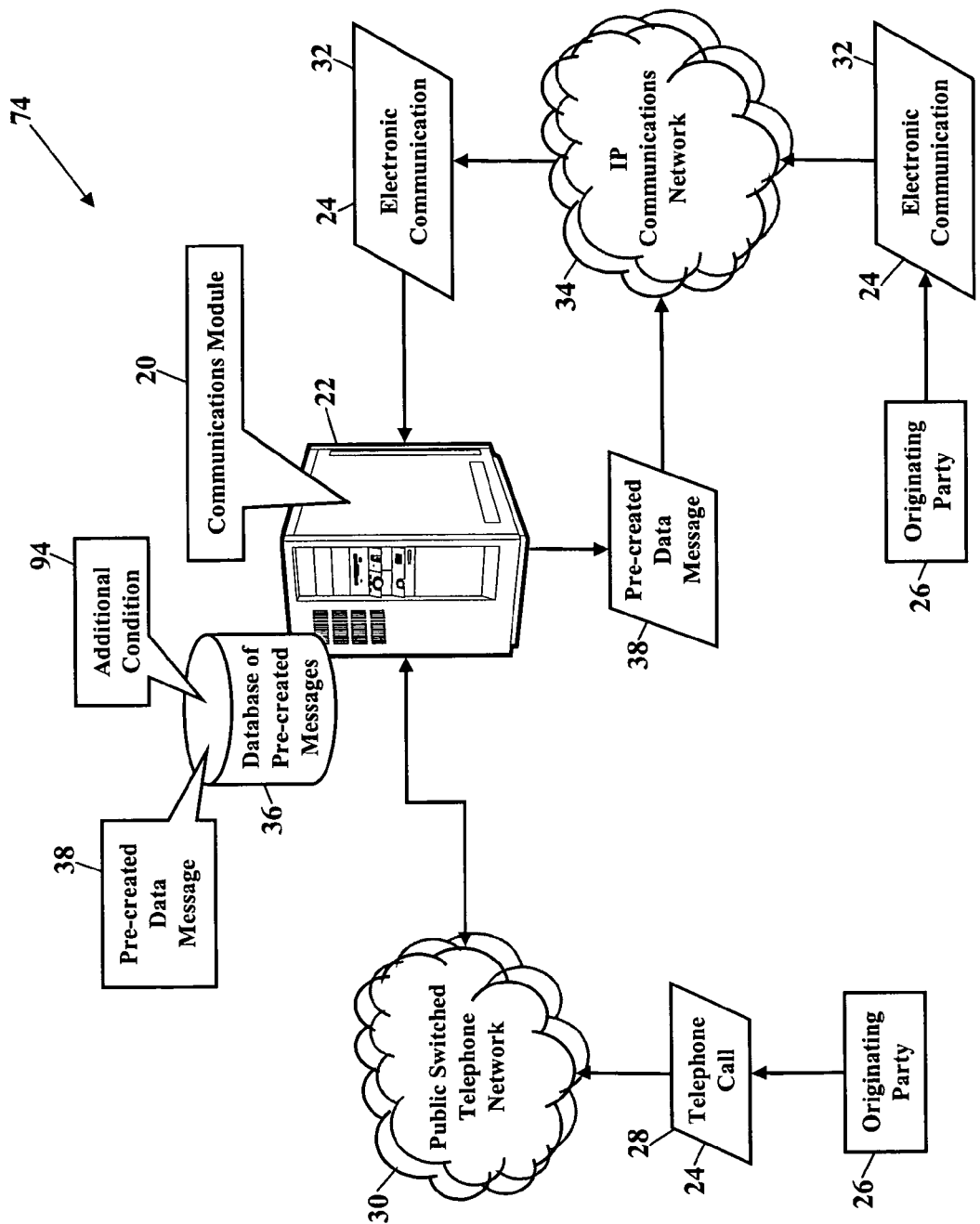
FIG. 6 is another schematic illustrating the embodiments of this invention.

FIG. 6 is another schematic illustrating the embodiments of this invention. FIG. 6 shows another method of providing communications services. FIG. 6 is similar to FIG. 1. Here, however, when the pre-created data message 38 is chosen, the pre-created data message 38 is selected based upon a common association between the originating party 26 (e.g., the calling party or the sender of the electronic communication 32) and an additional condition 94. The database 36 stores multiple pre-created data messages associated with the receiving party. That is, the receiving party of the communication 24 (whether the telephone call 28 or the electronic communication 32) can compose, store, and associate multiple pre-created data messages. A subscriber of this messaging service, then, can associate the originating party, a particular pre-created message, and the additional condition 94. The additional condition 94 can be any condition the subscriber/receiving party can logically describe.

The additional condition 94 could be a time/date. The subscriber might specify a particular pre-created data message for particular times of the day and/or days of the week. The subscriber, for example, might specify that if the telephone call 28 is received after 9 PM, and before 6 AM, the telephone call is not processed. The pre-created data message 38 is, instead, sent to an Internet Protocol address associated with the originating party 26 (e.g., the calling party). The pre-created data message 38 might read "We do not accept telephone calls after 9 PM. Please feel free to reply to this message and we will contact you in the morning." If the subscriber has a field inspection each Wednesday, the subscriber might specify that the originating party receive the pre-created data message 38 saying "Today is Wednesday, and I will be out of the office." As those of ordinary skill in the art should now understand, the subscriber might specify any number of pre-created data messages for particular times of the day and/or days of the week.

The additional condition 94 could be entries in an electronic calendar. If the subscriber maintains an electronic calendar accessible via the Internet Protocol communications network 34, the Communications Module 20 could interface with that calendar. The Communications Module 20 could select the pre-created data message 38 based upon a common association between the originating party 26 and an entry in the subscriber's electronic calendar. The Communications Module 20 could retrieve the entry in the calendar and automatically assemble the pre-created message 38. The subscriber, for example, might specify the generic message "From [start time] to [end time] I am in a meeting." The Communications Module 20 would access the calendar, retrieve the meeting times, and then complete the message. When the communication 24 is received, the pre-created data message 38 might read "From 10 AM to 11:30 AM I am in a meeting." If the calendar entry denotes a vacation day, the pre-created data message 38 might read "Today is Tuesday, and I will be on vacation. I will return to the office on Monday, June 5th."

The Communications Module 20 might also use calendar entries to assemble pre-created messages for individuals. The subscriber, as before, could compose the pre-created data message 38 and then associate that message 38 to one or individuals. The subscriber, for example, might compose "Mom, here is my calendar for [date]. I will call you as soon as I am free." If the subscriber's mother should call or electronically communicate, the Communications Module 20 retrieves the subscriber's calendar entries for the present day (or week or any other time/day). The subscriber's mother would then receive the pre-created data message 38 "Mom, here is my calendar for Thursday, June 8$^{th}$. 9 AM-10 AM meeting with Mr. Jones, 11:30 AM-1:30 PM group luncheon, 3 PM-5 PM conference call with Loa Angeles office. I will call you as soon as I am free." The subscriber simply composes whatever message is desired, with the desired calendar content, and the subscriber then associates that message to the individual(s).

The Communications Module 20 might also use other electronic tracking entries to assemble pre-created messages for individuals. Suppose, for example, the subscriber maintains an electronic task or "to do" list. The subscriber might specify that when a task is completed, the Communications Module 20 should automatically assemble the message "Doris, on [date] I have just completed the task of [task description]." When the subscriber completes or dismisses the task, the Communications Module 20 retrieves the task description and composes "Doris, on June 14 I have just completed the task of paint office walls." If the subscriber maintains electronic notes, the subscriber might specify that when a particular person calls or electronically communicates, the Communications Module 20 automatically assembles the message "Dave, this meeting is lasting longer than 1 thought. Here are my notes thus far." The Communications Module 20 then inserts the meeting notes. As those of ordinary skill in the art now understand, the Communications module 20 can interface with any electronic data and associate that electronic data to particular individuals.

The additional condition 94 could also be presence and/or availability information. The Communications Module 20 could use presence and availability information to compose the pre-created data message 38. The term "presence" means the subscriber, or one of the subscriber's Internet Protocol communications device (such as that shown as reference numeral 86 in FIGS. 4 and 5), has established a presence with the communications network 74. The term "availability" asks whether the subscriber is available to receive communications services and, if so, how the subscriber is available. When the communications network 74 detects that the subscriber's wireless phone, for example, is powered and operating, the communications network 74 would know the subscriber is "present" at the wireless phone. The communications network 74 could then automatically route telephone calls and electronic communications to the subscriber's wireless phone. The communications network 74, likewise, could detect the subscriber's presence when the subscriber logs on to the Internet Protocol communications network 34 and is, thus, available to send and receive electronic messages and other communications.

Even though the subscriber may have a presence, the subscriber may not be available to receive communications. Although the communications network 74, for example, may detect the presence of the subscriber's wireless phone, the subscriber may not wish to receive calls. The subscriber would then not be available to receive communications. The subscriber, alternatively, may be available only for certain calling party telephone numbers, such as the subscriber's home telephone number. The subscriber may also only be available for certain email addresses or other Internet Protocol identifiers/information.

The Communications Module 20 may use presence and availability information to compose the pre-created data message 38. Suppose the subscriber initiates a call using a wireless communications device (such as a cellular phone). The communications network 74 processes the call and, thus, knows the subscriber has a "presence" at the cellular phone. Should the subscriber then receive the POTS telephone call 28, the subscriber might specify that the Communications module 20 suspend processing of the telephone call 28 and, instead, return communicate the data message "I am on the phone, but I will promptly return your call. Please feel free to reply with a detailed message." Similarly, even though the subscriber has a presence at the cellular phone, the subscriber may not wish to receive calls to the cellular number. In this case the subscriber does not have "availability," so the subscriber might specify that the Communications module 20 suspend processing of incoming cellular calls and, instead, return communicate the data message "I am not available to receive your call, but please feel free to reply with a detailed message." Another example might involve mass electronic communications, commonly called "spamming." If the Communications Module 20 detects receipt of a spam electronic communication (whether email, facsimile, or other method), the subscriber might specify that the pre-created data message "Please remove this address from your mailing list" be sent. These are but a small example of how the subscriber might use presence and availability information to reduce unwanted intrusions and/or disturbances.

The additional condition 94 could also be search criteria/criterion. That is, the Communications Module 20 could select the pre-created data message 38 based upon a search of another database. The subscriber could specify whatever search criteria is desirable, and the Communications Module 20 could search any database/computer system communicating with the Internet Protocol communications network 34. Suppose again, for example, the subscriber coaches a baseball team. The subscriber could compose two data messages, depending upon the weather. When a member of the baseball teams calls or electronically communicates, the Communications Module 20 could be instructed to retrieve the local weather report via the Internet Protocol communications network 34. The additional condition 94, then, would be "weather" retrieved from a website (perhaps www.weather.com, www.bellsouth.net, a local television/radio station's website, or any other weather outlet) or monitoring equipment. If the additional condition 94 indicates sunny/fair weather, the subscriber might specify that the Communications Module 20 return communicates the data message "We will have baseball practice at 5 PM." If, however, the additional condition 94 indicates rain/poor weather, the subscriber might specify that the Communications Module 20 return communicate the data message "Baseball practice is canceled for [today]. We will reschedule for [tomorrow]" (note this example also accesses calendar entries and group listings). The subscriber might also specify that the search criterion is a sporting outcome. If the Atlanta Braves win the World Series, the subscriber might specify that the Communications Module 20 return communicate the data message "Braves won! Meet me at Don's Bistro!" If, however, the Braves lose, the pre-created data message 38 might read "Braves lost. I'm in no mood to socialize." The additional condition 94, then, would be a "sports score" retrieved from a website (perhaps www.espn.com, www.bellsouth.net, a local television/radio station's website, or any other sports outlet). The search criteria/criterion may be any data retrievable via the Internet Protocol communications network 34, such as news events, travel conditions, and health/medical information. Those of ordinary skill in the art, however, recognize that the possible search criteria/criterion are too numerous to list. Those of ordinary skill in the art understand, then, that the additional condition 94 can be any information retrievable via a local memory and/or via the Internet Protocol communications network 34.

Figure 7:
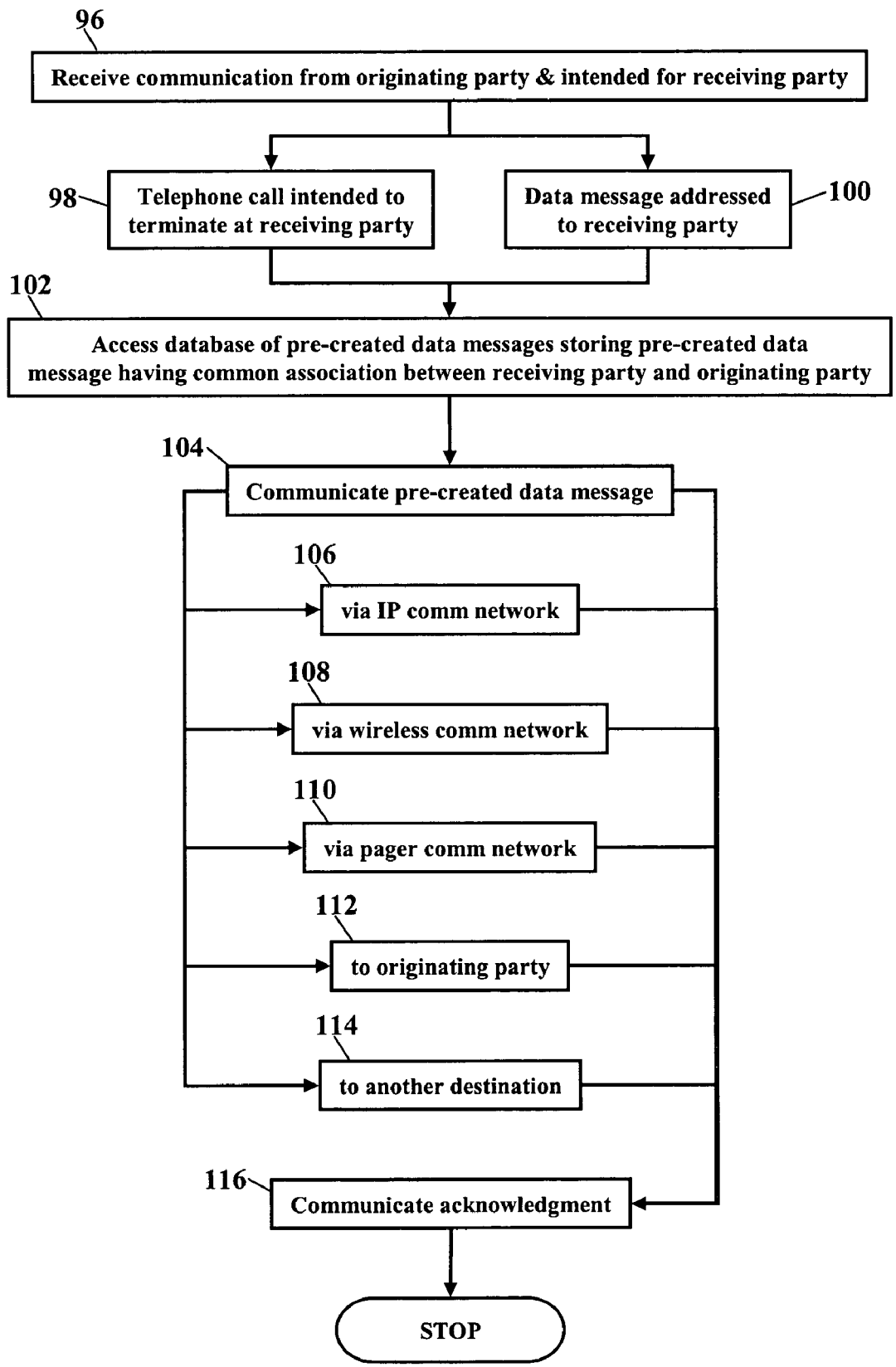
FIG. 7 is a flowchart illustrating a method of providing communications services, according to the embodiments of this invention.

FIG. 7 is a flowchart illustrating a method of providing communications services, according to the embodiments of this invention. A communication is received from an originating party (Block 96). The communication is intended for a receiving party. The communication may be a telephone call intended to terminate at the receiving party (Block 98). The communication may also be a data message addressed to the receiving party (Block 100). A database of pre-created data messages is accessed (Block 102). The database stores a pre-created data message having a common association between the receiving party and the originating party. The pre-created data message is then communicated (Block 104) via an Internet Protocol communications ("comm") network (Block 106), via a wireless communications ("comm") network (Block 108), and/or via a pager communications ("comm") network (Block 110). The pre-created data message may be communicated to the originating party (Block 112) and/or to another destination (Block 114). An acknowledgement may be communicated (Block 116) to confirm that the pre-created data message was communicated and/or received. The acknowledgment may be initiated by the destination. The acknowledgment may also be initiated by the Communications Module (shown as reference numeral 20 in FIGS. 1-6).

Figure 8:
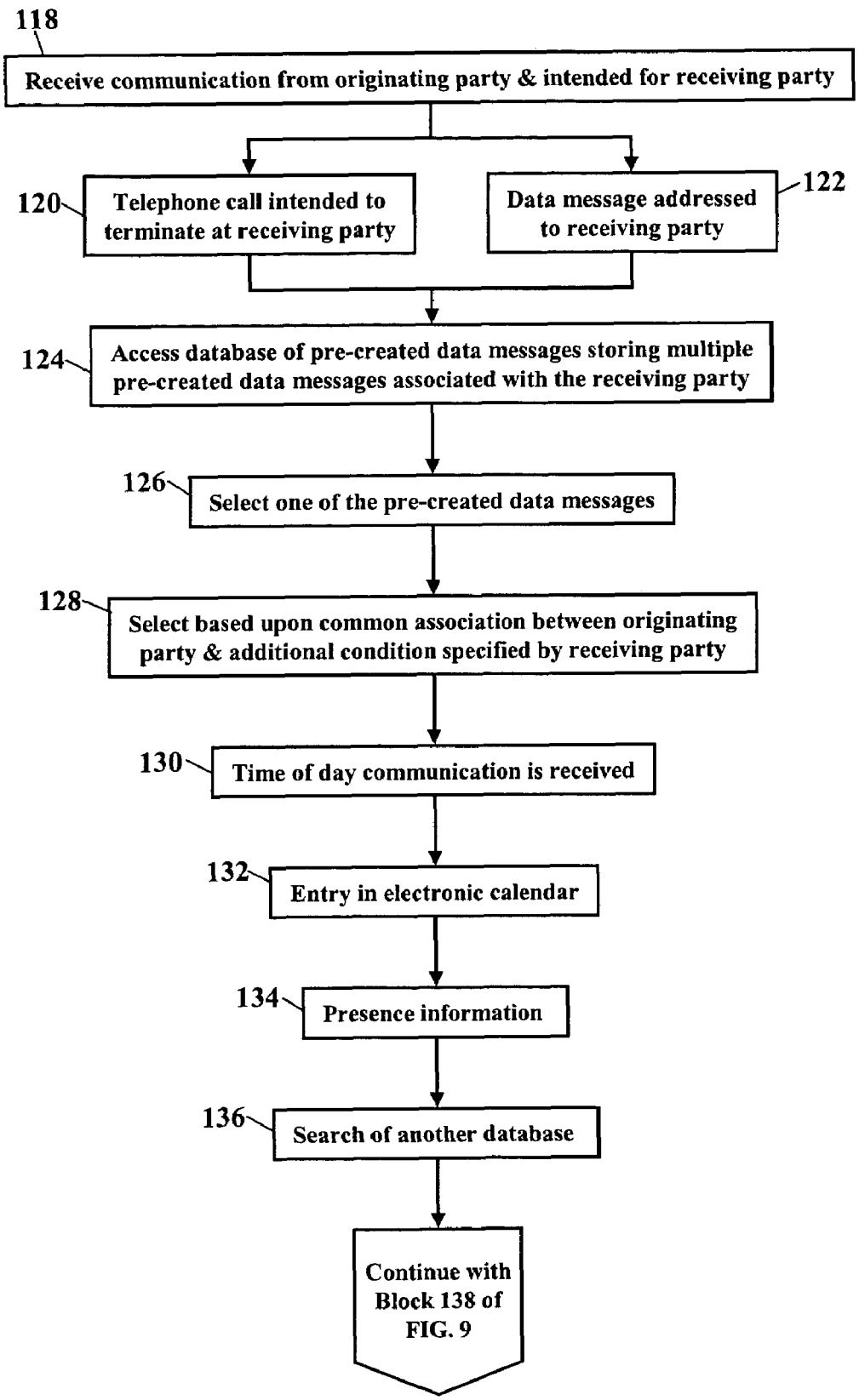
FIGS. 8 and 9 are flowcharts illustrating still another method of providing communications services, according to even more embodiments of this invention.

FIG. 8 is a flowchart illustrating another method of providing communications services, according to the embodiments of this invention. A communication is received from an originating party (Block 118). The communication is intended for a receiving party. The communication may be a telephone call intended to terminate at the receiving party (Block 120). The communication may also be a data message addressed to the receiving party (Block 122). A database of pre-created data messages is accessed (Block 124). The database stores multiple pre-created data messages associated with the receiving party. One of the pre-created data messages is selected (Block 126). The data message may be selected based upon a common association between the originating party and an additional condition (Block 128). The additional condition is specified by the receiving party. The additional condition may be a time of a day that the communication is received (Block 130), an entry in an electronic calendar (Block 132), presence information (Block 134), and/or a search of another database (Block 136).

Figure 9:
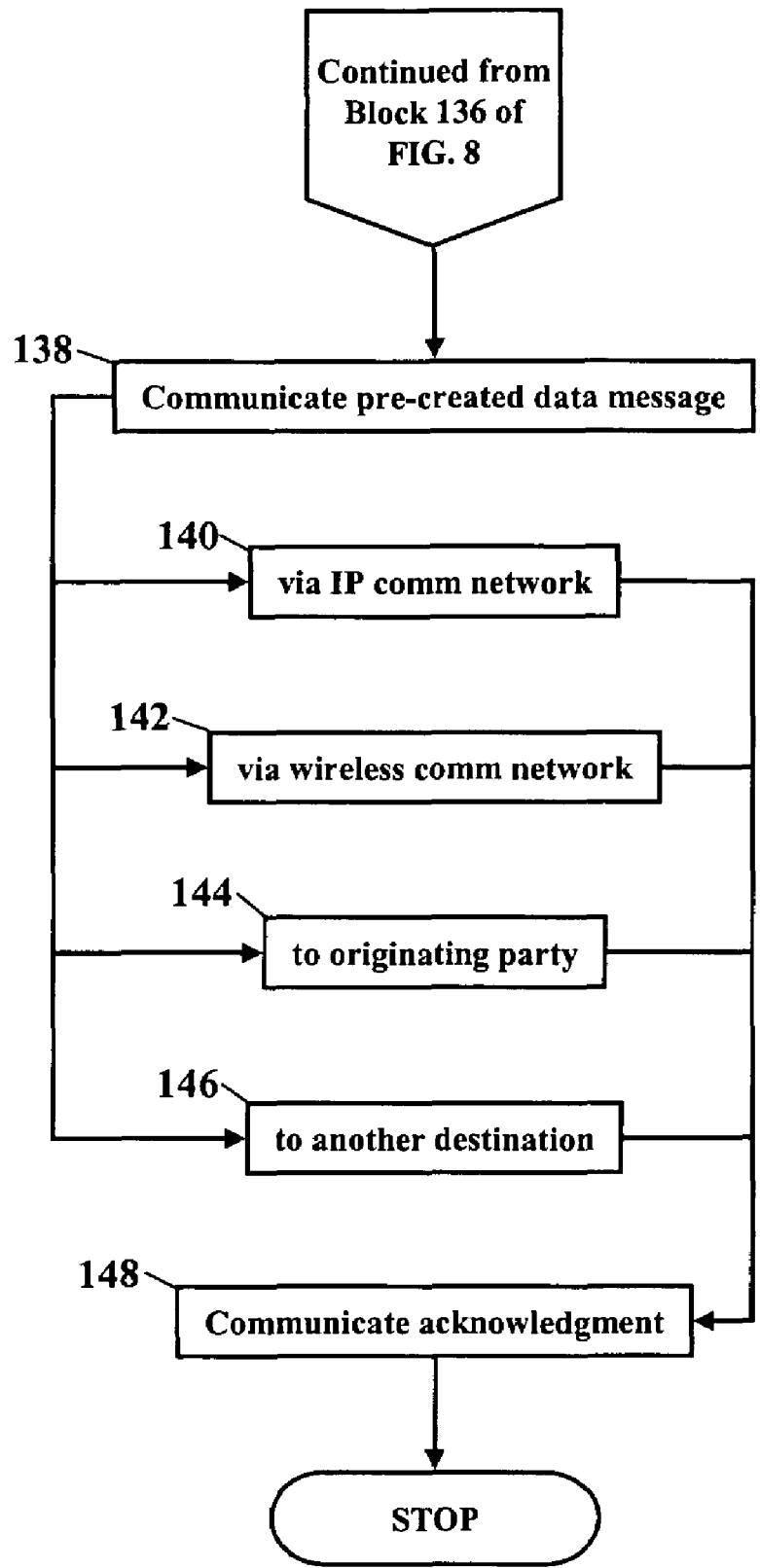

The flowchart continues with FIG. 9. After the data message is selected, the data message is communicated (Block 138) via an Internet Protocol communications network (Block 140) and/or via a wireless communications network (Block 142). One of the pre-created data messages may be communicated to the originating party (Block 144) and/or to another destination (Block 146). An acknowledgement may be communicated (Block 148) to confirm that the pre-created data message was communicated and/or received.

The Communications Module may also be physically embodied on or in any addressable (e.g., HTTP, I.E.E.E. 802.11, Wireless Application Protocol (WAP)) wireless device capable of accepting/presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:

receiving caller identification information identifying a call from an originating party to a receiving party;

querying a profile to determine whether the caller identification information matches an entry in a list of caller identification information;

when a match is found, then accessing a database of pre-created text messages, the database storing a pre-created text message having a common association between the receiving party and the caller identification information; and communicating the pre-created text message to an Internet Protocol address associated with the originating party.

2. A method according to claim 1, further comprising communicating the pre-created text message to a group of recipients associated with the originating party.

3. A method according to claim 1, wherein communicating the pre-created text message comprises wirelessly communicating the pre-created text message via a wireless communications network.

4. A method according to claim 1, wherein communicating the pre-created text message comprises wirelessly communicating the pre-created text message via a pager communications network.

5. A method according to claim 1, further comprising receiving a telephone call intended to terminate at the receiving party.

6. A method according to claim 1, further comprising communicating the pre-created text message to another destination.

7. A method of providing communications services, comprising:
- receiving a call for a receiving party and a time of day of receipt;
- receiving caller identification information associated with the call and identifying an originating party;
- querying a profile to determine whether the caller identification information matches an entry in a list of caller identification information;
- when a match is found, then accessing a database of pre-created text messages, the database storing multiple pre-created text messages associated with the receiving party;
- selecting one of the pre-created text messages having a common association between the receiving party and the caller identification information; and
- communicating the pre-created text message to the originating party.

8. A method according to claim 7, wherein communicating the pre-created text message comprises communicating the pre-created text message via an Internet Protocol communications network.

9. A method according to claim 7, wherein communicating the pre-created text message comprises wirelessly communicating the pre-created text message via a wireless communications network.

10. A method according to claim 7, further comprising receiving a telephone call intended to terminate at the receiving party.

11. A method according to claim 7, further comprising communicating the pre-created text message to another destination.

12. A method according to claim 7, wherein selecting one of the pre-created text messages comprises selecting one pre-created text message having a common association between the originating party and an additional condition, the additional condition specified by the receiving party.

13. A method according to claim 12, wherein the additional condition comprises entries in an electronic calendar.

14. A method according to claim 12, wherein the additional condition comprises presence information.

15. A method according to claim 12, wherein the additional condition is based on a search of another database.

16. A system of providing communications services, the system comprising:
- means for receiving caller identification information identifying a call from an originating party to a receiving party;
- means for querying a profile to determine whether the caller identification information matches an entry in a list of caller identification information;
- when a match is found, means for accessing a database of pre-created text messages, the database storing a pre-created text message having a common association between the receiving party and the caller identification information; and
- means for communicating the pre-created text message to an Internet Protocol address associated with the originating party.

17. A computer program product comprising processor-executable instructions for:
- receiving caller identification information identifying a call from an originating party to a receiving party;
- querying a profile to determine whether the caller identification information matches an entry in a list of caller identification information;
- when a match is found, then accessing a database of pre-created text messages, the database storing a re-created text message having a common association between the receiving party and the caller identification information; and
- communicating the pre-created text message to an Internet Protocol address associated with the originating party.

* * * * *